United States Patent
Sevilla R. et al.

(10) Patent No.: US 10,892,881 B2
(45) Date of Patent: *Jan. 12, 2021

(54) SIGNAL LINK BUDGET OPTIMIZATION

(71) Applicant: Verizon Patent and Licensing Inc., Arlington, VA (US)

(72) Inventors: Francisco X. Sevilla R., Edina, MN (US); Ronald A. Goldschmidt, Waconia, MN (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 9 days.

This patent is subject to a terminal disclaimer.

(21) Appl. No.: 16/456,359

(22) Filed: Jun. 28, 2019

(65) Prior Publication Data

US 2019/0319773 A1 Oct. 17, 2019

Related U.S. Application Data

(63) Continuation of application No. 15/696,421, filed on Sep. 6, 2017, now Pat. No. 10,382,186.

(51) Int. Cl.
| | |
|---|---|
| *H04L 5/14* | (2006.01) |
| *H04W 72/04* | (2009.01) |
| *H04B 1/00* | (2006.01) |
| *H04B 7/04* | (2017.01) |
| *H04B 1/18* | (2006.01) |

(52) U.S. Cl.
CPC ............. *H04L 5/14* (2013.01); *H04B 1/0057* (2013.01); *H04B 1/18* (2013.01); *H04B 7/04* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 10,382,186 B2* | 8/2019 | Sevilla R. | ......... H04W 72/0453 |
| 2013/0182753 A1 | 7/2013 | Delforce et al. | |
| 2016/0352612 A1 | 12/2016 | Daniel | |
| 2017/0111864 A1 | 4/2017 | Ashworth et al. | |
| 2018/0084596 A1 | 3/2018 | Schwengler et al. | |
| 2018/0248676 A1 | 8/2018 | Raggio et al. | |

* cited by examiner

Primary Examiner — Diane L Lo

(57) ABSTRACT

In a centralized radio access network, a system in a remote radio unit combines signals from multiple radios and independently attenuates uplink and downlink signals for multiple antennas connected to the multiple radios. The system includes two Or more antennas; a radio set including a first analog front end configured for a first channel of a first frequency band and a second analog front end configured for a second channel of a second frequency band; and a signal combining and conditioning (SCC) unit coupled in series between the radio set and the two or more antennas. The SCC unit includes downlink passive attenuators for downlink signals from the radio set to each of the two or more antennas and uplink passive attenuators for uplink signals from each of the two or more antennas to the radio set.

20 Claims, 9 Drawing Sheets

SIGNAL LINK BUDGET OPTIMIZATION

CROSS REFERENCE TO RELATED APPLICATION

This application is a continuation of U.S. patent application Ser. No. 15/696,421 filed on Sep. 6, 2017, the disclosure of which is hereby incorporated by reference.

BACKGROUND

Wireless network congestion may occur when high concentration of wireless devices in the same area, such as in a service venue, attempt to use wireless data communications. The service venue may be, for example, a stadium, an arena, an amusement park, a shopping mall, a parking garage, or any other type of geographical area where the wireless devices may want to access on-line services concurrently from a small geographic area. For example, in a sporting venue, attendees may utilize high bandwidth services that may collectively outstrip capacity of the available wireless spectrum. Some attendees may want to watch additional video coverage of a game being played to be able to see supplemental content, such alternate camera angles or the visiting team's broadcast, that is not otherwise available to those actually attending the event. Other attendees may desire to upload images or video to share on social media.

Additional small base stations may be added to the service venue to increase wireless capacity in localized areas. However, without precise signal adjustment, the additional base stations may offer limited benefit. For example, overlapping signals from multiple base stations may result in poor signal quality.

DETAILED DESCRIPTION OF THE PREFERRED EMBODIMENTS

The following detailed description refers to the accompanying drawings. The same reference numbers in different drawings may identify the same or similar elements.

A link budget accounts for the gains and losses from a transmitter, through a medium (free space, wires, etc.) to the receiver in a telecommunications network. Primary factors in optimizing signal link budgets in wireless access networks include: (1) losses in the feed line from a transmitter to a transmitting antenna and (2) free-space path losses between the transmitting antenna and a receiving antennas. According to implementations described herein, strategic placement of numerous low-powered micro-radios—each utilizing multiple distributed antennas in conjunction with passive signal processing equipment—minimizes these signal losses between transmitters and receivers. As described further herein, link budgets may be optimized to enable dense placement of small cell devices in areas of highly concentrated UE activity. The small cell devices may be used to supplement capacity of wireless access networks during events and venues where large crowds of mobile device users are expected.

Figure 1:
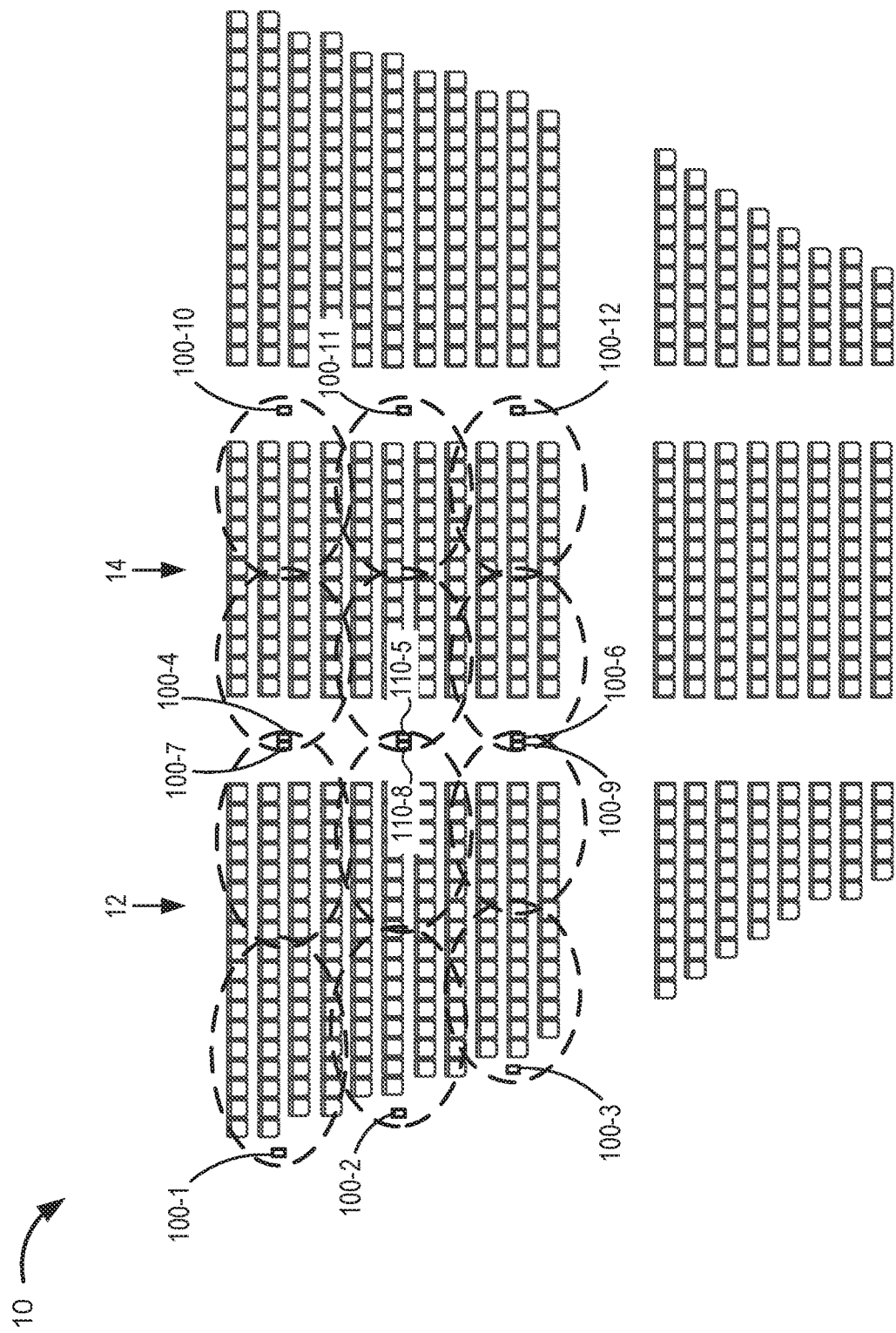
FIG. 1 is a diagram of an exemplary environment in which systems and methods described herein may be implemented.

FIG. 1 is a diagram of an exemplary environment in which systems and methods described herein may be implemented. As shown in FIG. 1, a stadium seating area 10 employs a grouping of small, low-power antennas 100-1 through 100-12 (referred to collectively as "antennas 100" and generically as "antenna 100") to supplement wireless capacity. In the example of FIG. 1, a supplemental coverage pattern for two seating sections 12 and 14 is shown.

Maximizing wireless capacity with dense antenna placement, such as in the arrangement of FIG. 1, requires precise control (e.g., attenuation, direction, etc.) of radio frequency (RF) signals to provide separate coverage for a defined space, sometimes referred to as a small cell. As shown in FIG. 1, directionally-oriented antennas 100-1 through 100-6 may provide supplemental coverage for seating section 12, and directionally-oriented antennas 100-7 through 100-12 may provide supplemental coverage for seating section 14. Antennas 100 (and the associated components described further herein) may support multiple frequency bands for wireless communications (e.g., including, but not limited to, the Advanced Wireless Services (AWS) bands, the 700C band, the Personal Communications Service (PCS) band, etc.). Power levels, directions, and other settings for antennas 100 may be adjusted to minimize interference. In one implementation, antennas 100 may be deployed throughout a service venue (e.g., stadium seating area 10) in handrails, signage, support stanchions, etc. While FIG. 1 is shown in the context of a stadium seating environment, implementations described herein may apply to other densely populated indoor or outdoor spaces such as theaters, arenas, concert halls, shopping malls, medical centers, high-rise buildings, parking lots, parking garages, etc.

According to implementations described herein a centralized radio access network (C-RAN) includes multiple remote radio heads (RRHs) deployed throughout a service venue. Each RRH may include micro-radio sets, with each of the micro-radio sets using different frequency bands. The RRH may use multiple local antennas and provide independent attenuation of downlink and uplink traffic, differently for each antenna, using passive components.

Figure 2:
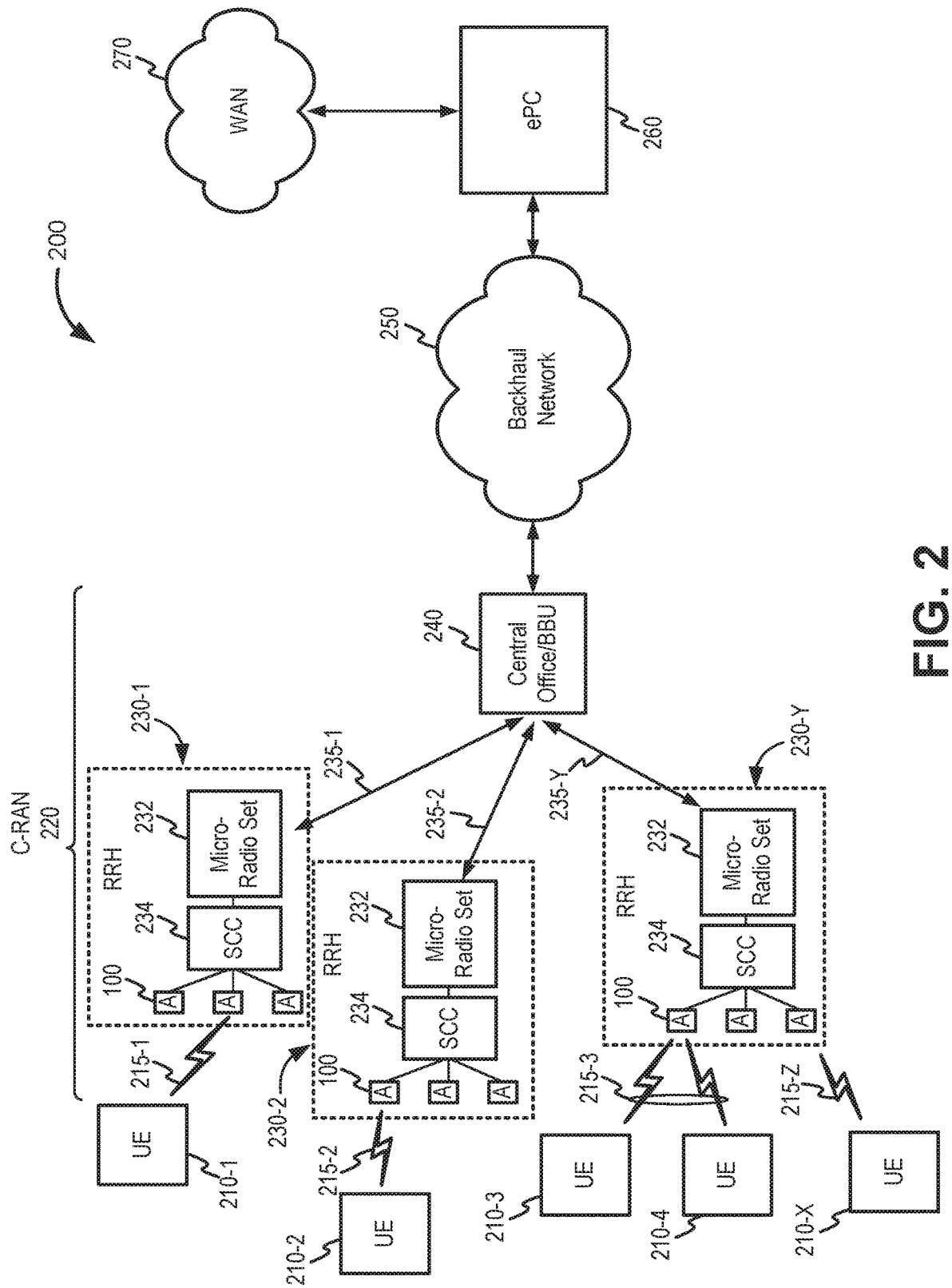
FIG. 2 is a diagram that depicts an exemplary network environment in which systems and methods described herein may be implemented.

FIG. 2 is a diagram illustrating an exemplary network environment 200 for employing signal link budget optimization in venues with areas of highly concentrated user equipment activity. Network environment may include user equipment devices (UEs) 210-1 through 210-X (collectively referred to as "UEs 210" and generically as "UE 210"), a C-RAN 220, a backhaul network 250, an evolved packet core (ePC) 260, and a wide area network (WAN) 270. The C-RAN 220 may further include RRHs 230-1 through 230-Y (collectively referred to as "RRHs 230" and generically as "RRH 230") and at least one central office 240 (where only one is shown in FIG. 1 for brevity).

UEs 210 may include any type of mobile device having wireless communication capabilities, and thus communicate with the appropriate RRHs 230 using a variety of different wireless channels/frequency bands. In some embodiments, the mobile device may be configured to additionally communicate within network environment 200 using a wired connection. Thus a UE 210-x may be a mobile device that may include, for example, a cellular radiotelephone, a smart phone, a tablet, a mobile phone, any type of internet protocol (IP) communications device, a Voice over Internet Protocol (VoIP) device, a laptop computer, a palmtop computer, a wearable computer, a gaming device, a media player device, a digital camera that includes communication capabilities, a vehicle control systems integrated within an automobile, etc. In various embodiments, the wireless channels 215 may be supported by any cellular radio access network (RAN), such as, for example, a 4G long term evolution (LTE) evolved universal terrestrial radio access network (eUTRAN). In other embodiments, the wireless channel 215 may be supported by a local or wide area wireless network. The local area wireless network may include, for example, any type of Wi-Fi® network (e.g., any IEEE 801.11x network, where x=a, b, c, g, and/or n). A wide area wireless network may include any type of wireless network covering larger areas, and may include a mesh network (e.g., IEEE 801.11s) and/or or a WiMAX IEEE 802.16. Details of an embodiment of a HE are discussed below in reference to FIG. 8.

A conventional base station, such as, for example, an eNodeB in an LTE system, may be replaced by C-RAN 220, which may include multiple RRHs 230 and central office 240, as shown in FIG. 2. Dividing the base station into separate units allows a wireless network operator to flexibly establish and modify wireless coverage in a cost effective manner. Alternatively, the C-RAN 220 may have a communicative link to a macro cell architecture (e.g., an eNodeB, etc.)

RRH 230 may include antennas 100, a micro-radio set 232, and a signal combining and conditioning (SCC) unit 234. RRHs 230 may provide radio frequency (RF) functionality to establish wireless channels 215 with UEs 210. RRHs 230 may be embodied in different form factors having different sizes and various capabilities. In one embodiment, one or more RRHs 230 may be realized as a small cell (e.g., a femto-cell) to provide wireless coverage over smaller areas, which may include indoor placements. Details of RRHs 230 are discussed below in connection with FIGS. 3-5, for example.

Central office 240 may provide routing, load balancing, and digital base band functionality for communications between UEs 210 and ePC 260. Central office 240 may be physically displaced from the RRHs 230, and may consolidate processing resources that may be shared among multiple RRHs 230. Details of central office 240 are described below in connection with FIG. 8.

Backhaul network 250 may be any type network that supports one or more central offices 240 for interfacing with ePC 260. Backhaul network 250 may include Cell Site Routers (CSRs), Extended Back Haul (EBH) network(s), optical networks that include wavelength division multiplexed (WDM) optical components, multiservice provisioning platforms (MSPPs), metro-Ethernet networks, multi-protocol label switching (MPLS) networks, optical transport networks (OTN), etc.

The ePC 260 may be a core networking infrastructure that provides mobility management, session management, authentication, and packet transport to support UEs 210 and C-RAN 220 for wireless communication, and further provides wireless networking elements access to WAN 270. ePC 260 may be compatible with known wireless standards which may include, for example, LIE, LTE Advanced, Global System for Mobile Communications (GSM), Universal Mobile Telecommunications System (UMTS), IS-2000, etc.

WAN 270 may be any type of wide area network connecting back-haul networks and/or core networks, and may include a metropolitan area network (MAN), an intranet, the Internet, a cable-based network (e.g., an optical cable network), networks operating known protocols, including Asynchronous Transfer Mode (ATM), Optical Transport Network (OTN), Synchronous Optical Networking (SONET), Synchronous Digital Hierarchy (SDH), Multiprotocol Label Switching (MPLS), and/or Transmission Control Protocol/Internet Protocol (TCP/IP).

UEs 210 may wirelessly access ePC 260 though C-RAN 220 via backhaul network 250. Each RRH 230 may establish one or more cells to provide wireless connectivity over wireless channels 215-1 through 215-Z (collectively referred to as "wireless channels 215" and generically as "wireless channel 215") in a designated area. For example, referring to FIG. 2, the proximity of UE 210-1 to an antenna 100 of RRH 120-1 may cause UE 210-1 to exchange data and control signals with RRH 230-1 through wireless channel 215-1. The proximity of UE 210-2 to an antenna 100 of RRH 230-2 may cause UE 210-2 to exchange data and control signals with RRH 230-2 through wireless channel 215-2. The proximity of UE 210-3 and UE 210-4 to an antenna 100 of RRH 230-Y may cause UE 110-3 and UE 110-4 to exchange data and control signals with RRH 230-Y through wireless channel 215-3.

RRHs 230 may exchange data with central office 240, which includes forwarding data received from UEs 210 to central office 240, and receiving data from central office 240 for forwarding to appropriate UEs 210. In one embodiment, RRHs 230 and central office 240 may exchange data over wired channels 235-1 through 235-Y (collectively referred to herein as "wired channels 235" and generically as "wired channel 235"). In some embodiments, the wired channels may include fiber optic connections based on the common public radio interface (CPRI). Alternatively, wired channels 235 may use other protocols, such as, for example the open base station architecture initiative (OBSAI). In other embodiments, wireless connections (e.g., such as microwave relays) may be used instead of one or more wired channel 235 as a communications interface between RRHs 230 and central office 240.

Central office 240 may interface with ePC 260 though backhaul network 250. While FIG. 2 only shows one central office 240 connected to backhaul network 250, backhaul network 250 may be connected to a plurality of central offices, which in turn may be connected to other RRHs. In an embodiment, central offices communicate with each other to, for example, distribute processing loads improve the quality of service of UEs 210 operating within network environment 200, The backhaul network 250 may interface to ePC 260 which handles data flows over user plane traffic (e.g., Access Stratum functionality), and perform control operations for central office 240 and UEs 210 based at least n part on control plane signals (e.g., Non-Access Stratum functionality). ePC 260 may interface with WAN 270 to exchange data with other network devices. WAN 270 may include a plurality of networks which can span large areas, and may include the Internet, thus enabling UEs 210 to communicate over practically any geographical distance.

Additionally, embodiments described herein may be presented within the context of the Long Term Evolution (LTE) wireless standard for ease of explanation. However, aspects of the invention are not restricted to the LTE standard, and may be applied to other networking standards, such as, for example, LTE Advanced, Global System for Mobile Communications (GSM), Universal Mobile Telecommunications System (UNITS), IS-2000, etc.

Figure 3:
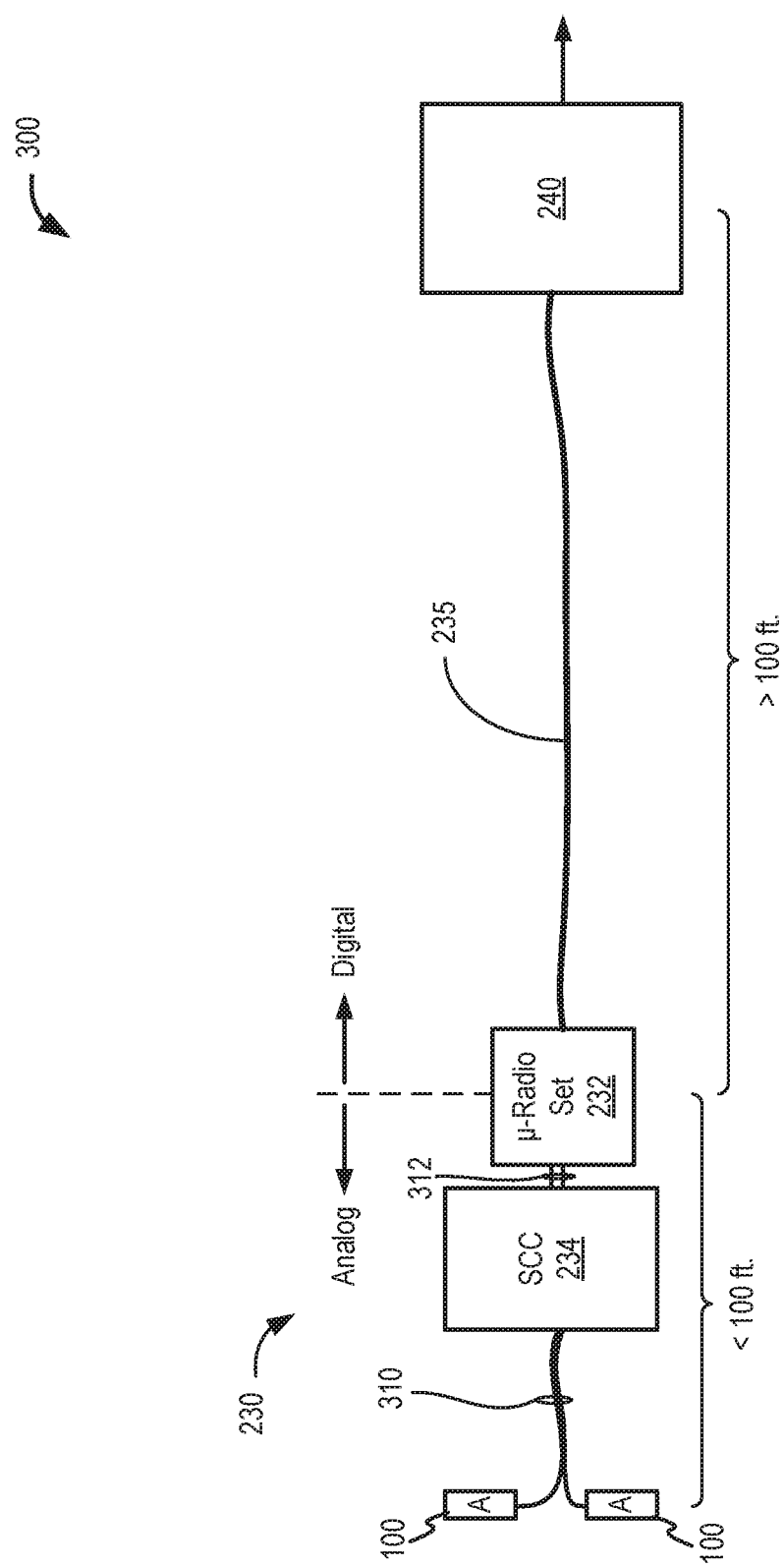
FIG. 3 is a simplified schematic of a portion of the centralized radio access network of FIG. 2.

FIG. 3 is a simplified schematic of a portion 300 of GRAN 220. As shown in FIG. 3, network portion 300 may include RRH 230 and central office 240. RRH 230 may include antennas 100, micro-radio set 232, and SCC unit 234. Analog signals may pass between micro-radio sets 232 and antennas 100. Antennas 100 may be connected to SCC unit 234 via coaxial cables 310, and coaxial connectors 312 may be used to connect micro-radio set 232 and SCC unit 234. In one implementation, coaxial connectors 312 may each be less than ten feet in length. In another implementation, micro-radio set 232 and SCC unit 234 may be directly connected on a common platform. According to an implementation each micro-radio set 232 may connect to multiple antennas 100, such as two or three antennas distributed locally near micro-radio set 232. In one implementation, micro-radio set 232 and SCC unit 234 may be co-located or mounted adjacent each other.

RRH 230 may be designed for indoor and/or outdoor use, and may be relatively small compared to traditional base stations. RRH 230 may be ruggedly constructed for ease of portability and operation without air conditioning facilities. Given its relative simplicity, RRH 230 may be suitable for use as a small cell, which may include, for example, e-femtocells, microcells, etc., suitable for both commercial and/or domestic applications.

Antenna 100 includes one or multiple antennas capable of wirelessly receiving data and wireless transmitting data. Antenna 100 may be configured in correspondence to various architectures (e.g., single input single output (SISO), single input multiple output (SIMO) (e.g., switched diversity SIMO, maximum ratio combining SIMO), multiple input single output (MISO), or multiple input multiple output (MIMO)). Antenna 100 may also be configured according to various designs and parameters pertaining to angle spread, port correlation, antenna spacing, vertical/horizontal configurations, tilt, etc., as well as other aspects of wireless transmission and reception of data (e.g., beamforming, transmit diversity, etc.).

According to an implementation, antenna 100 may include a remote electrical tilting (RET) antenna. The RET antenna can adjust the electrical tilt angle of a variable tilt antenna through electro-mechanical actuators (such as a stepper motor). In one implementation, the RET antenna can receive tilt commands over a UTRAN Want interface (through coaxial cables 310), for example, and move the tilt actuator appropriately. Antenna 100 may generally be sized to fit within the confined space of a handrail, sign post, support stanchion, etc. In one implementation, each antenna 100 includes an electrical tilt capability that enables each antenna pattern to be adjusted differently (e.g., for covering different parts of seating sections 12, 14 of stadium seating area 10).

Generally, micro-radio set 232 and SCC unit 234 may be positioned as close as practicable to antennas 100 to minimize link losses. In one implementation, each micro-radio set 232 may be connected to three antennas 100. For example, referring to FIG. 1 above, antennas 100-1, 100-2, and 100-3 may all be connected to one micro-radio set 232, while antennas 100-4, 100-5, and 100-6 may be connected to a different micro-radio set 232. In another implementation, each micro-radio set 232 may be connected to two antennas 100. For example, referring to FIG. 1 above, antennas 100-1 and 100-4 may all be connected to one micro-radio set 232, while antennas 100-7 and 100-10 may be connected to a different micro-radio set 232. According to an implementation, the length of coaxial cables 310 may be approximately 50 feet (about fifteen meters) or less and no more than one hundred feet (about thirty meters). According to another implementation, the length of coaxial cables 310 may be limited to any length that provides no more than a 3 dB loss. By contrast, the length of wired channels 235 (e.g., fiber optic cable) may be hundreds or thousands of feet.

Figure 4:
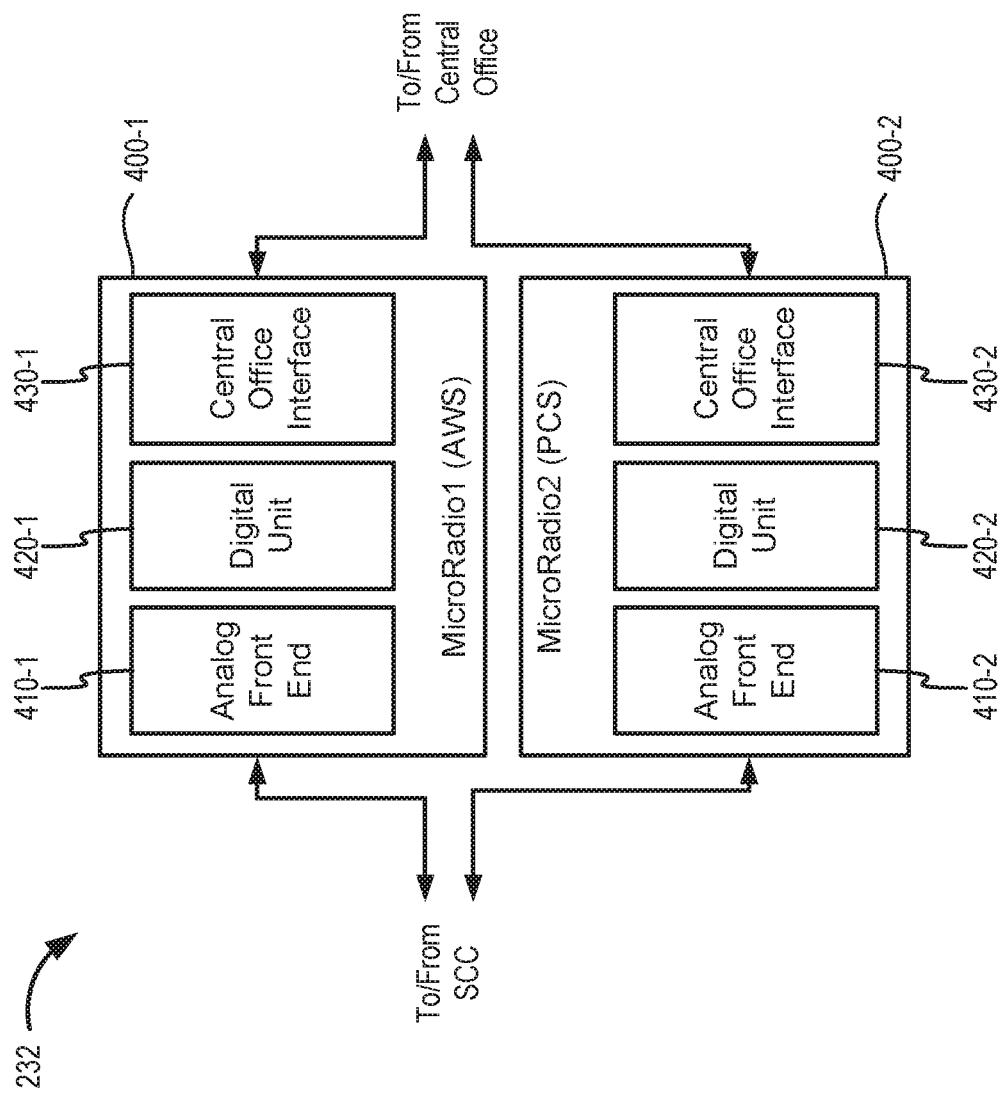
FIG. 4 is a block diagram depicting exemplary functionality of the micro-radio set of FIG. 2.

Micro-radio set 232 is described further in connection with FIG. 4. FIG. 4 is a block diagram depicting exemplary functionality of micro-radio set 232. Referring to FIG. 4, micro-radio set 232 may include different radios 400-1 and 400-2 (referred to herein collectively as "radios 400" and generically as "radio 400") supporting different frequency bands, such as any one of Evolved Universal Terrestrial Radio Access (E-UTRA) bands 1 through 44 (e.g., the AWS) band, the 700C band, the PCS band, the Cellular 850 band, etc.). For example, radio 400-1 may operate on a particular LIE band. More particularly, each radio 400 of micro-radio set 232 may support a single uplink and downlink channel within a frequency band. In one implementation, each radio 400 may operate at low power, such as 37 decibel-milliwatts (dBm).

Each radio 400 may include an analog front end 410, a digital unit 420, and a central office interface 430. Radio 400 may act as a transceiver to exchange RF signals with one or more UEs 210 located within the cell established by RRH 230. On the uplink channel, RRH 230 may receive RF signals transmitted by UE(s) 210 over wireless channels 215 at antenna 100. Antenna 100 may provide the received RF signals to analog front end 410 via SCC unit 234. Analog front end 220 may down convert the frequency of the received RF signals to an intermediate frequency for digitization in digital unit 420. Digital unit 420 may perform some sample rate conversion and data formatting, so the digitized signals are in a suitable form to be provided to central office interface 430. Central office interface 430 may convert the received digitize signals in to a packet and/or frame format suitable for transmission over wired connections 235.

On the downlink channel, RRH 230 may receive digital data from central office 240. Central office interface 430 may receive the digital data over wired connection 235. Central office interface 430 may reformat the data and/or perform error correction, and provide the data to digital unit 420. Digital unit 420 may perform digital frequency up conversion and sample rate conversion prior to conversion to an analog signal. Analog front end 410 may receive the analog signal from digital unit 420, perform analog frequency up conversion to RF, and amplify the RF signal prior to transmission to antenna 100 via SCC unit 234. Central office interface 240 may use, for example, the CPRI protocol and/or the OBSAI protocol.

Figure 5A:
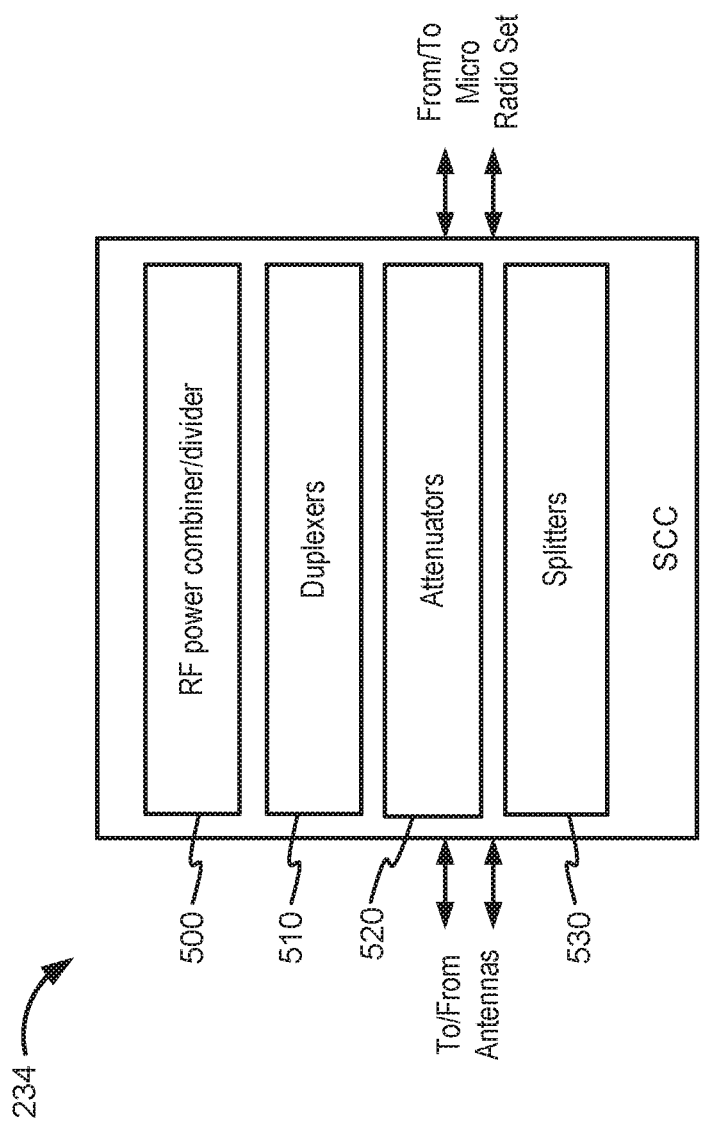
FIG. 5A is a block diagram depicting exemplary functionality of the signal combining and conditioning unit of FIG. 2.
Figure 5B:
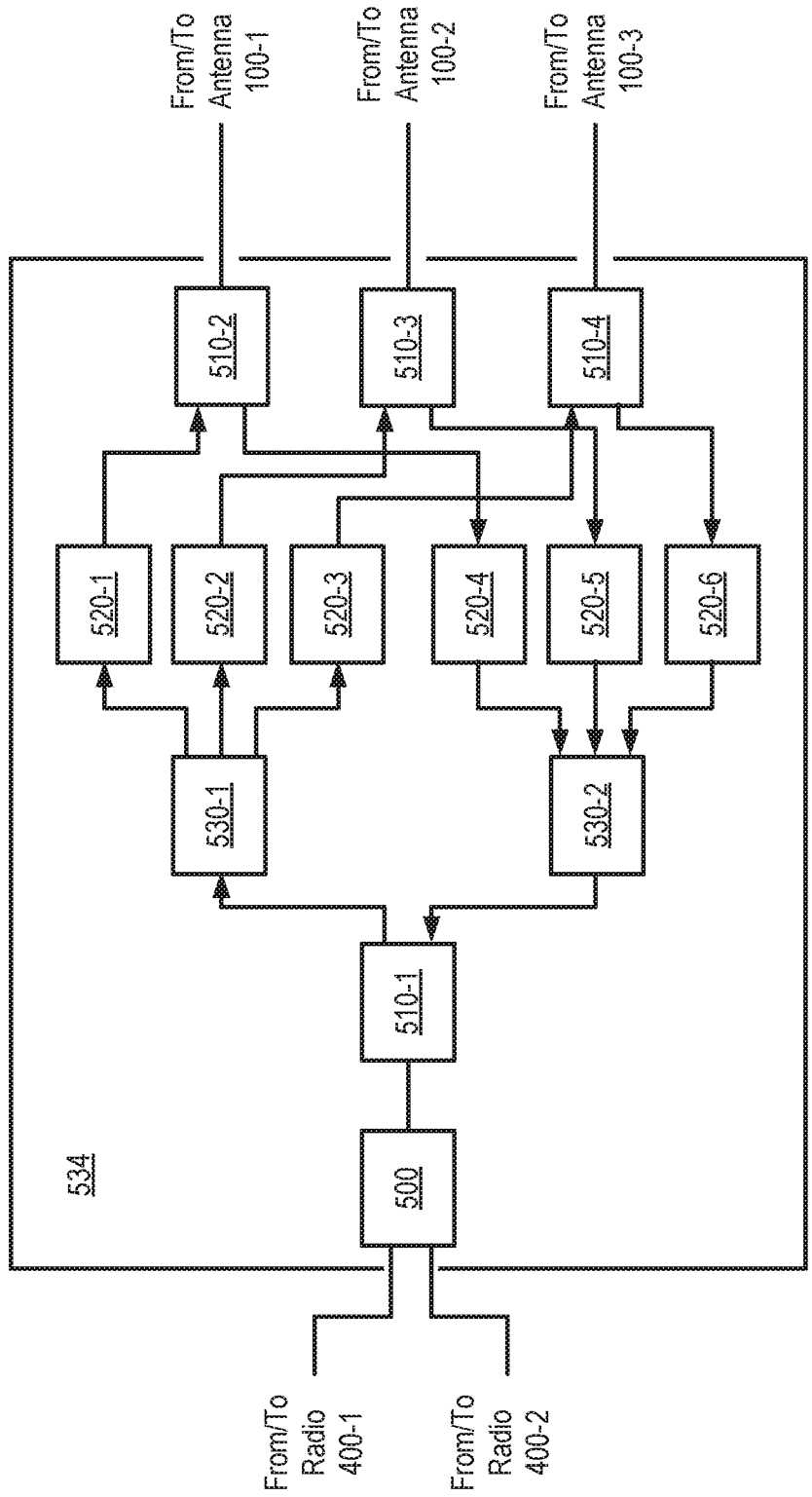
FIG. 5B is a simplified schematic of an embodiment of the signal combining and conditioning unit of FIG. 2.

SCC unit 234 is described further in connection with FIGS. 5A and 5B. FIG. 5A is a block diagram depicting exemplary functionality of SCC unit 234. SCC unit 234 may generally be a multiple input multiple output (MIMO) device that provides in-line signal attenuation control for uplink and downlink traffic. SCC unit 234 may include RF power combiner/dividers 500, duplexers 510, attenuators 520, and splitters 530. According to one implementation, each of RF power combiner/dividers 500, duplexers 510, attenuators 520, and splitters 530 may be passive components. According to other implementations, one or more of RF power combiner/dividers 500, duplexers 510, attenuators 520, or splitters 530 may be active components.

RF power combiner/dividers 500 may include one or more diplexers or other devices to separates two different frequency bands in a downlink (transmit) path and combine then uplink (receive) path. For example, an RIF power combiner/divider 500 may receive downlink signals from radios 400-1 and 400-2 and combine them for downstream attenuation. Additionally, the RF power combiner/divider 500 may receive attenuated uplink signals and combine them for radios 400-1 and 400-2.

Duplexers 510 may isolate downlink and uplink traffic in SCC unit 234. For example, a duplexer employed at one end of SCC unit 234 may isolate uplink and downlink signals to/from radios 400. In another aspect, duplexers 510 may be used to isolate uplink and downlink signals at each antenna 100 interface.

Attenuators 520 decrease signal strength to allow for dense placement of small cells without interference. According to implementations described herein, a separate downlink attenuator 520 may be used for each downlink path to an antenna 100, and a separate uplink attenuator 520 may be used for each uplink path and from an antenna 100. In one implementation, attenuators 520 may include a low passive intermodulation (PIM), unidirectional attenuator that can cover multiple wireless bands. According to an implementation, attenuators 520 may be switched RF attenuators that are independently adjustable. In one implementation, attenuation ranges of attenuators 520 may be manually adjustable in one decibel (dB) steps. Independent adjustment of uplink and downlink attenuators 520 may be used to model and implement precise supplemental signal coverage for different sized areas.

Splitters 530 may include one or more power splitters to evenly split signals (e.g., cellular frequency signals). For example, splitters 530 may split combined downlink signals from duplexers 510 to send to the different downlink paths for attenuation to each antenna 100. Additionally, splitters 530 may combine attenuated uplink signals received from each antenna 100 to send toward radios 400.

The ability of SCC unit 234 to differently attenuate signal power levels to/from each antenna 100, in combination with the adjustable tilt of each antenna 100, allows the antenna coverage (or small cell area) for each antenna 100 to be individually shaped. Referring to FIG. 1, for example, a coverage area associated with antenna 100-1 may require different attenuation levels than coverage areas associated with antennas 100-2 or 100-3.

Specific arrangements of RF power combiner/dividers 500, duplexers 510, attenuators 520, and splitters 530 within SCC 234 may vary depending on the number of microradios 400 and antennas 100 for a particular RRH 230 configuration. Additionally, different specifications and/or capacities of RF power combiner/dividers 500, duplexers 510, attenuators 520, and splitters 530 may govern the particular number and arrangement of these components within SCC 232. In some implementations, multiple off-the-shelf components may be combined to achieve required SCC unit 234 functionalities described herein.

FIG. 5B is a simplified schematic of an embodiment 534 of SCC unit 234. More particularly, SCC unit 534 provides a two radio-to-three antenna MIMO system. As shown in FIG. 5B, for downlink traffic, downlink signals from radios 400-1 and 400-2 may feed into RF power combiner/divider 500, which combines the signals from radios 400-1 and 400-2 and passes them to duplexer 510-1. Duplexer 510-1 may send the combined downlink signals to splitter 530-1, which may be a one-to-three power splitter. Power splitter 530-1 may divide the combined downlink signals into three equal-powered downlink signals and pass them to attenuators 520-1, 520-2, and 520-3, respectively. Each of attenuators 520-1, 520-2, and 520-3 may be set to a different downlink attenuation level for a respective antenna 100-1, 100-2, and 100-3 to provide precise small cell coverage. The attenuated downlink signals from attenuators 520-1, 520-2, and 520-3 may be received by duplexer 510-2, 510-3, and 510-4, respectively. Duplexer 510-2, 510-3, and 510-4 may send the signals out through respective antennas 100-1, 100-2, and 100-3.

For uplink traffic, antennas 100-1, 100-2, and 100-3 may pass uplink signals (e.g., from UEs 210) to respective duplexers 510-2, 510-3, and 510-4. Duplexer 510-2 may forward uplink signals from antenna 100-1 to attenuator 520-4; duplexer 510-3 may forward uplink signals from antenna 100-2 to attenuator 520-5; and duplexer 510-4 may forward uplink signals from antenna 100-3 to attenuator 520-6. Each of attenuators 520-4, 520-5, and 520-6 may be set to a different uplink attenuation level for a respective antenna 100-1, 100-2, and 100-3. The attenuated uplink signals from attenuators 520-4, 520-5, and 520-6 may be received by power splitter 530-2, which combines them in a single path to duplexer 510-1. Duplexer 510-1 may isolate and send the combined uplink signals to RF power combiner/divider 500, RF power combiner/divider 500 may forward the attenuated uplink signals to respective radios 400-1 and 400-2.

Although FIG. 5B shows exemplary components of SCC unit 534, in other implementations, SCC unit 534 may include fewer components, different components, differently-arranged components, or additional components than depicted in FIG. 5B. For example, in one implementation, additional splitters included immediately before or after RF power combiner/divider 500 may be used to balance power between SCC units 534 for sets of adjacent antennas (e.g., antenna 100-4 through 100-6 for one SCC unit 234 and antennas 100-7 through 100-10 for another SCC unit 234). Additionally or alternatively, one or more components of SCC unit 534 may perform functions described as being performed by one or more other components of SCC unit 534.

Figure 6:
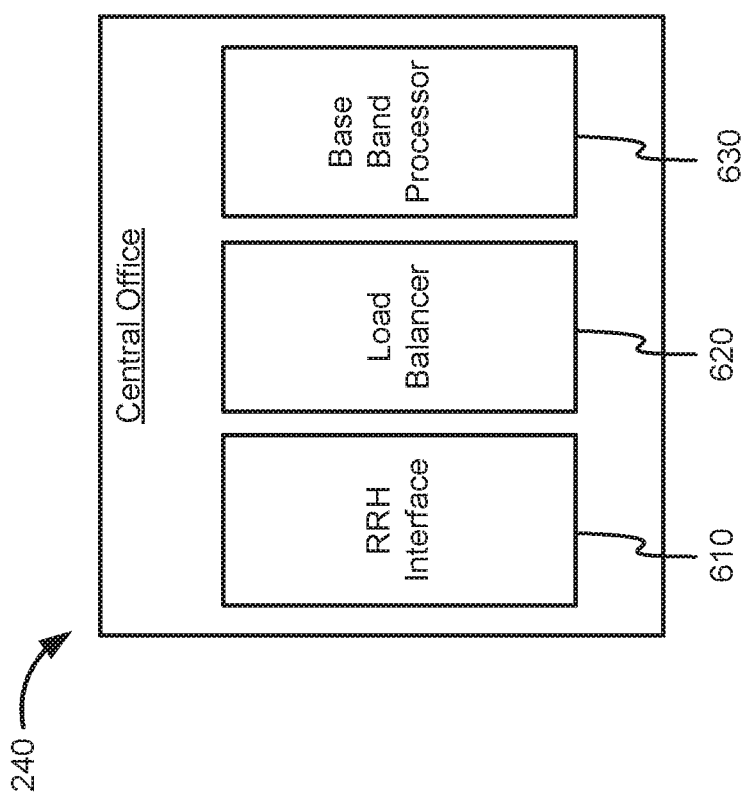
FIG. 6 is a block diagram depicting exemplary functionality of the central office of FIG. 2.

FIG. 6 is a block diagram depicting exemplary functionality of central office 240 which may be included in network environment 200 shown in FIG. 2. Central office 240 may include an RRH interface 610, a load balancer 620, and a base band processor 630. Central office 240 may consolidate the intensive base band processing used for proper communications across wireless channels 215 into a single location. By not replicating base band units at each RIM 230 location in C-RAN 220, equipment costs and space may be saved at each location, and overall power consumption may be reduced.

Central office 240 may exchange control and communication data between RRHs 230 and ePC 260. In some embodiments, central office 240 also communicate with other central offices attached to backhaul network 250 to perform distributed processing and/or load balancing among central offices within network environment 200. On the uplink channel, central office 240 may receive digital data over wired connections 235 at RRH interface 610. The digital data may include signals originating from UE 210 which may have been down converted to an intermediate frequency. RRH interface 610 may perform error correction decoding and framing to reformat the received data for subsequent processing by load balancer 620 and base band processor 630. Load balancer 620 may manage traffic flows from all of the RRHs 230 to maintain quality of service (QoS) requirements among UEs 210. Load balancer 620 may provide data to base band processor 630 which may digitally down convert the data to base band, perform symbol demodulation, demultiplex orthogonal frequency division multiple access (OFDMA) signals from multiple UEs 210, perform error correction decoding, and/or MIMO processing, to form individual data flows for UEs 210 which may be provided to backhaul network 250. On the downlink channel, central office 240 may receive base band data from backhaul network 250, where base band processor 630 may perform symbol modulation, multiplex signals from multiple IEs 210 using OFDMA processing, perform error correction encoding, and/or MIMO processing to combine data flows from multiple UEs 210. Load balancer 620 may receive data from base band processor 630 and manage data flows based on QoS requirements, and provide the managed data flows to RRH interface 610. RRH interface 610 may perform error correction encoding and/or framing to reformat the managed data flows for transmission over wired connections 235 to the appropriate RRHs 230. RRH interface 610 may be based on the CPRI protocol and/or the OBSAI protocol.

Figure 7:
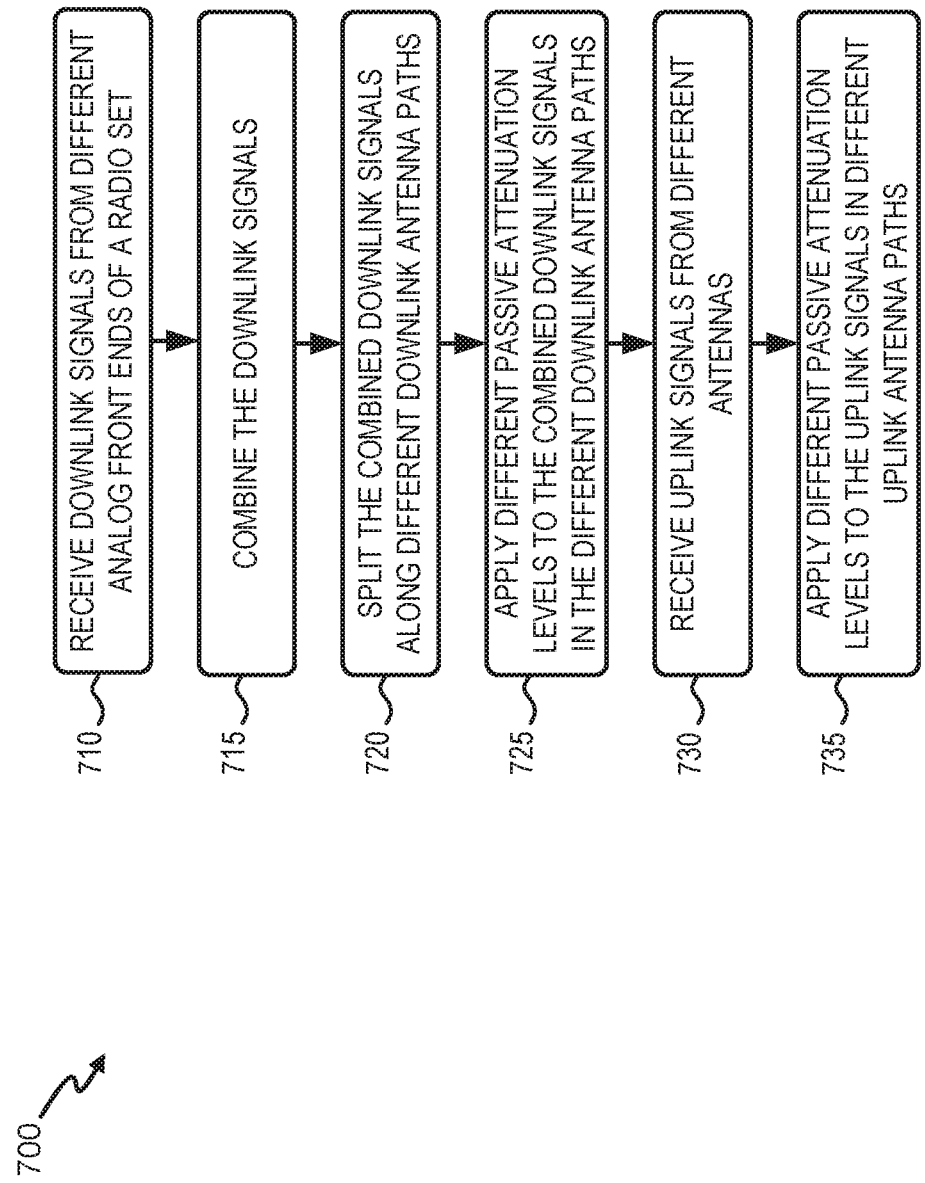
FIG. 7 is a flow diagram illustrating an exemplary process for implementing signal link budget optimization in service venue according to an implementation described herein.

FIG. 7 is a flow diagram illustrating an exemplary process 700 for implementing signal link budget optimization in a service venue. In one implementation, process 700 may be implemented by devices in RRH 230. In another implementation, process 700 may be implemented by devices in RRH 230 in conjunction with one or more other devices in network environment 200, such as one or more devices in central office 240.

Process 700 may include receiving downlink signals from different analog front ends of a radio set (block 710). For example, SCC 234 may receive downlink signals with an AWS frequency from analog front end 410-1 of micro-radio 400-1 and other downlink signals with a PCS frequency from analog front end 410-2 of micro radio 400-2. Signals from analog front ends 410 may be sent via different coaxial connectors 312.

Process 700 may also include combining the downlink signals (block 715) and splitting the combined downlink signals along different downlink antenna paths (block 720). For example, RF power combiner/divider 500 may cot bine downlink signals from micro radios 400 into a single link/wire. Splitter 530 may divide the combine downlink signal into different downlink paths for each antenna 100 used with RRH 230. For example, if RRH 230 uses two antennas 100, a 1-to-2 downlink splitter 530 may be used. As another example, if RRH 230 uses three antennas 100, a 1-to-3 downlink splitter 530 may be used, and so forth.

Process 700 may further include applying different passive attenuation levels to the combined downlink signals in the different downlink antenna paths (block 725). For example, attenuators 520 in each downlink antenna path may apply different attenuation levels to the combined downlink signals. Thus, the attenuation level for downlink signals provided to each antenna 100 used with an RRH 230 may be precisely attenuated for optimal coverage in a particular service venue (e.g., stadium seating area 10).

Process 700 may additionally include receiving uplink signals from different antennas (block 730) and applying different passive attenuation levels to the uplink signals in different uplink antenna paths (block 735). For example, different antennas 100 for an RRH 230 (e.g., antennas 100-1, 100-2, and 100-3) may receive uplink signals from UEs 210. UEs 210 may use different AWS and/or PCS channels, for example. The uplink signals may be sent through different uplink antenna paths to uplink attenuators 520. Since each of attenuators 520 may be set independently, the attenuation levels for the different downlink antenna paths may be different from each other and different from than the attenuation levels in the uplink antenna paths.

Figure 8:
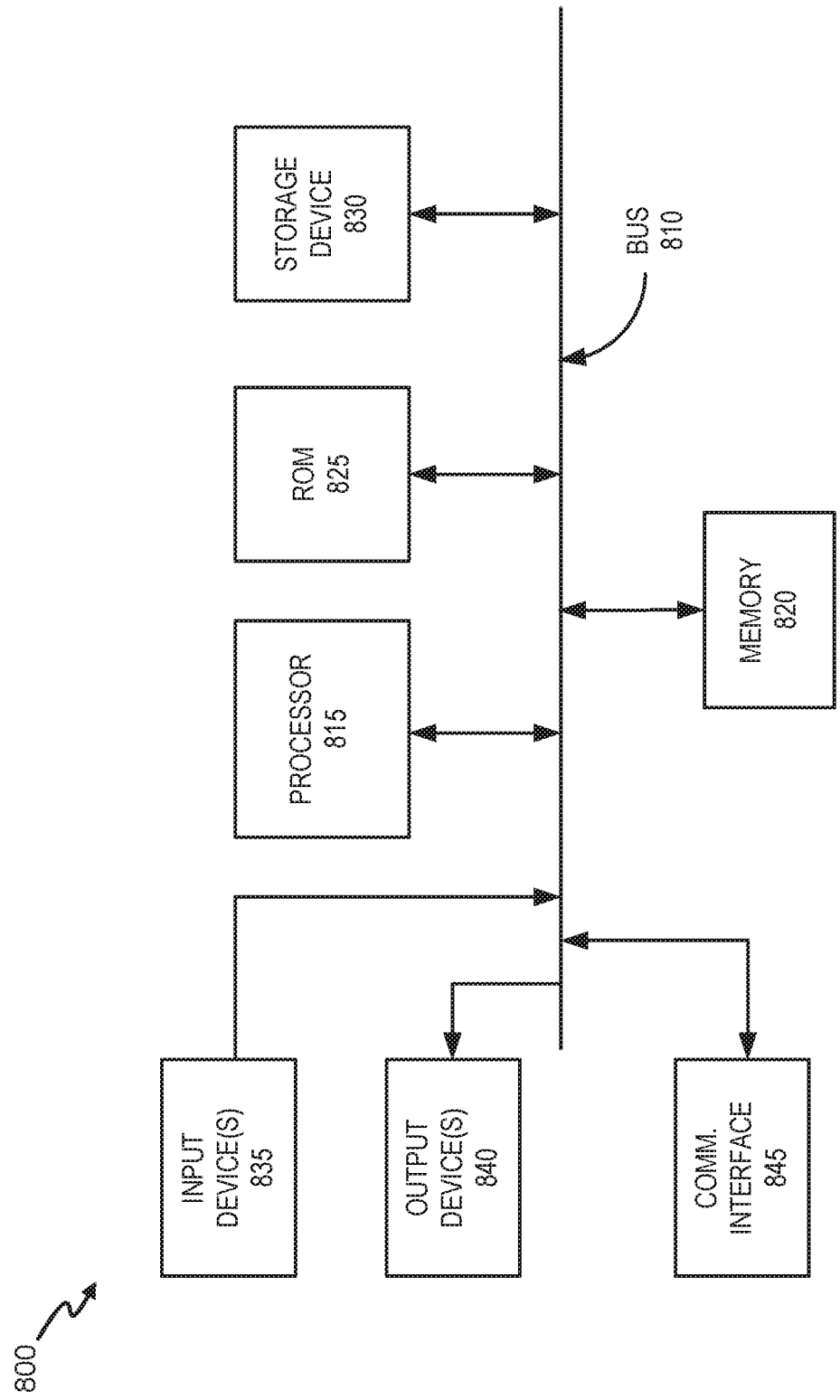
FIG. 8 is a diagram of exemplary components that may be included in one or more of the devices or networks shown in FIG. 2.

FIG. 8 is a diagram illustrating exemplary physical components of a device 800. Device 800 may correspond to network elements and/or UEs 210 depicted in environment 200. Device 800 may include a bus 810, a processor 815, memory 820, a read only memory (ROM) 825, a storage device 830, one or more input device(s) 835, one or more output device(s) 840, and a communication interface 845. Bus 810 may include a path that permits communication among the elements of device 800.

Processor 815 may include a processor, microprocessor, or processing logic that may interpret and execute instructions. Memory 820 may include a random access memory (RAM) or another type of dynamic storage device that may store information and instructions for execution by processor 815. ROM 825 may include a ROM device or another type of static storage device that may store static information and instructions for use by processor 815. Storage device 830 may include a magnetic and/or optical recording medium and its corresponding drive.

Input device(s) 835 may include one or more mechanisms that permit an operator to input information to device 800, such as, for example, a keypad or a keyboard, a microphone, voice recognition, components for a touchscreen, and/or biometric mechanisms, etc. Output device(s) 840 may include one or more mechanisms that output information to the operator, including a display (e.g., an LCD), a speaker, etc. Communication interface 845 may include any transceiver mechanism that enables device 800 to communicate with other devices and/or systems. For example, communication interface 845 may include mechanisms for communicating with another device or system via a network through RRHs 230 via wireless channels 215.

Device 800 may perform certain operations or processes, as may be described herein. Device 800 may perform these operations in response to processor 815 executing software instructions contained in a non-transitory computer-readable medium, such as memory 820. A non-transitory computer-readable medium may be defined as a physical or logical memory device. A logical memory device may include memory space within a single physical memory device or spread across multiple physical memory devices. The software instructions may be read into memory 820 from another computer-readable medium, such as storage device 830, or from another device via communication interface 845. The software instructions contained in memory 820 may cause processor 815 to perform operations or processes. Alternatively, hardwired circuitry may be used in place of or in combination with software instructions to implement processes consistent with the principles of the embodiments. Thus, exemplary implementations are not limited to any specific combination of hardware circuitry and software.

The configuration of components of device 800 illustrated in FIG. 8 is for illustrative purposes only. It should be understood that other configurations may be implemented.

Therefore, device 800 may include additional, fewer and/or different components than those depicted in FIG. 8.

According to an implementation described herein, systems and methods are employed in a centralized radio access network. In one implementation, a system in a remote radio unit may combine signals from multiple radios and may independently attenuate uplink and downlink signals for multiple antennas connected to the multiple radios. The system may include two or more antennas; a radio set including a first analog front end configured for a first channel of a first frequency band and a second analog front end configured for a second channel of a second frequency band; and a SCC unit coupled in between the radio set and the two or more antennas. The SCC unit may include downlink passive attenuators for downlink signals from the radio set to each of the two or more antennas and uplink passive attenuators for uplink signals from each of the two or more antennas to the radio set.

Implementations described herein may reduce the cost of RAN deployment and operations compared to, for example, an active distributed antenna system (DAS). The systems and methods described herein enable signal link budget optimization of the uplink and downlink signals individually without degrading RF performance.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 7, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system, comprising:
two or more antennas;
a radio set including a first analog front end configured for a first channel of a first frequency band and a second analog front end configured for a second channel of a second frequency band; and
a signal combining and conditioning (SCC) unit coupled between the radio set and the two or more antennas, the SCC unit further comprising:
a first set of downlink passive attenuators for downlink signals from the radio set to each of the two or more antennas, wherein the first set includes a separate downlink attenuator for each downlink path to the two or more antennas, and
a second set of uplink passive attenuators for uplink signals from each of the two or more antennas to the radio set, wherein the second set includes a separate uplink attenuator for each uplink path to the two or more antennas.

2. The system of claim 1, wherein attenuation settings for each of the downlink passive attenuators in the first set and each of the uplink passive attenuators in the second set are independently configured.

3. The system of claim 1, wherein each of the two or more antennas are directionally-oriented antennas.

4. The system of claim 1, wherein the radio set further sends and receives radio frequency (RF) signals using Long Term Evolution (LTE) wireless standards.

5. The system of claim 4, wherein the first channel of the first frequency band is in an Advanced Wireless Services (AWS) band and the second channel of the second frequency band is in a Personal Communications Service (PCS) band.

6. The system of claim 1, wherein each of the two or more antennas include a remote electrical tilting (RET) antenna.

7. The system of claim 1, wherein attenuation ranges of each of the downlink passive attenuators in the first set and each of the uplink passive attenuators in the second set are adjustable in 1 decibel (dB) steps.

8. The system of claim 1, wherein each of the downlink passive attenuators in the first set and each of the uplink passive attenuators in the second set include an independently adjustable, low passive intermodulation (PIM), uni-directional attenuator.

9. The system of claim 1, wherein the two or more antennas comprise three antennas, wherein the first set comprises at least three downlink passive attenuators, and wherein the second set comprises at least three uplink passive attenuators.

10. The system of claim 1, wherein the SCC unit further comprises a diplexer to:
combine downlink signals of different frequencies from the first analog front end and the second analog front end, and separate uplink signals from the two or more antennas into frequencies for the first analog front end and the second analog front end.

11. The system of claim 10, wherein the SCC unit further comprises a back-end duplexer to:
isolate the combined downlink signals from the diplexer from uplink signals received from the uplink passive attenuators.

12. The system of claim 11, wherein the SCC unit further comprises:
a downlink power splitter to split the isolated downlink signals from the duplexer into separate paths for each of the downlink passive attenuators, and
an uplink power splitter to combine uplink signals from each of the uplink passive attenuators into a single downlink path for the duplexer.

13. The system of claim 12, wherein the SCC further comprises multiple front-end duplexers, each of the multiple front-end duplexers being connected to one of the two or more antennas.

14. The system of claim 13, wherein each of the multiple front-end duplexers isolate uplink signals received by one of the two or more antennas from downlink signals received from one of the downlink passive attenuators.

15. A method, comprising:
receiving, by a signal combining and conditioning (SCC) unit coupled between a low-powered radio set and first and second antennas, first downlink signals from a first analog front end of the low-powered radio set, the first analog front end configured for a first channel of a first frequency band;
receiving, by the SCC unit, second downlink signals from a second analog front end of the low-powered radio set, the second analog front end configured for a second channel of a second frequency band;
combining, by the SCC unit, the first and second downlink signals;
splitting, by the SCC unit, the combined first and second downlink signals along a first downlink antenna path and a second downlink antenna path;
applying, by the SCC unit, attenuation to the combined first and second downlink signals in the first antenna path and the second antenna path, wherein an attenuation level in the first downlink antenna path forms a first attenuated downlink signal and wherein a different attenuation level in the second downlink antenna path forms a second attenuated downlink signal;
sending, by the SCC unit, the first attenuated downlink signal to the first antenna;
sending, by the SCC unit, the second attenuated downlink signal to the second antenna;
receiving, by the SCC unit, first uplink signals from the first antenna;
receiving, by the SCC unit, second uplink signals from the second antenna; and
applying, by the SCC unit, attenuation to the first and second uplink signals in a first uplink antenna path and a second uplink antenna path, wherein an attenuation level in the first uplink antenna path is different than an attenuation level in the second uplink antenna path.

16. The method of claim 15, wherein sending the first attenuated downlink signal comprises sending the first attenuated downlink signal over a connection with no more than a 3 decibel (dB) loss.

17. The method of claim 15, further comprising:
combining, by the SCC unit and after applying the attenuation, the first and second uplink signals.

18. The method of claim 17, further comprising:
separating the combined first and second uplink signals into frequencies for the first analog front end and the second analog front end.

19. The method of claim 15, wherein the first antenna and the second antenna are directionally-oriented antennas.

20. The method of claim 19, wherein the first channel of the first frequency band is in an Advanced Wireless Services (AWS) band and the second channel of the second frequency band is in a Personal Communications Service (PCS) band.

\* \* \* \* \*